(12) United States Patent
Wingo

(10) Patent No.: US 11,597,323 B1
(45) Date of Patent: Mar. 7, 2023

(54) TRUCK BUMPER STEPS

(71) Applicant: Guy Charles Wingo, Apopka, FL (US)

(72) Inventor: Guy Charles Wingo, Apopka, FL (US)

( * ) Notice: Subject to any disclaimer, the term of this patent is extended or adjusted under 35 U.S.C. 154(b) by 0 days.

(21) Appl. No.: 17/300,664

(22) Filed: Sep. 20, 2021

(51) Int. Cl.
*B60R 3/00* (2006.01)
*B62D 65/16* (2006.01)

(52) U.S. Cl.
CPC ............... *B60R 3/00* (2013.01); *B62D 65/16* (2013.01)

(58) Field of Classification Search
CPC .................................. B60R 3/00; B62D 65/16
See application file for complete search history.

(56) References Cited

U.S. PATENT DOCUMENTS

| | | | | |
|---|---|---|---|---|
| 2,142,749 A * | 1/1939 | Graves | ..................... | B60D 1/50 280/489 |
| 7,717,445 B2 * | 5/2010 | Peterson | ................. | B60R 3/002 280/166 |
| 8,038,164 B2 * | 10/2011 | Stahl | ......................... | B60R 3/00 280/166 |
| 8,668,217 B2 * | 3/2014 | Ziaylek | ..................... | B60R 3/02 280/166 |
| 8,827,294 B1 * | 9/2014 | Leitner | ..................... | B60R 3/02 280/166 |
| 9,884,601 B1 * | 2/2018 | Candido | ................. | B60R 19/52 |
| 9,931,987 B2 * | 4/2018 | Baeza | ..................... | B60R 3/007 |
| 10,106,088 B2 * | 10/2018 | Smith | ..................... | B60R 16/023 |
| 10,493,920 B2 * | 12/2019 | Leitner | ..................... | B60R 3/02 |
| 10,773,670 B2 * | 9/2020 | Smith | ..................... | B60R 19/48 |
| 2017/0120830 A1 * | 5/2017 | Baeza | ..................... | B60R 3/007 |

FOREIGN PATENT DOCUMENTS

EP          2252482          1/2012

* cited by examiner

*Primary Examiner* — Bayan Salone
(74) *Attorney, Agent, or Firm* — Edward M. Livingston, Esq.; Livingston Law, P.A.

(57) ABSTRACT

A bumper step (1) for installation on a vehicle, such as a truck, having a step portion (3) and a tube armature (10) and a Z-clip bracket (11). The tube armature is inserted into a rear tube chassis (5) of the vehicle and the bumper step is secured to the vehicle by bolting the Z-clip bracket to s slot (8) in a side chassis rail (7) of the vehicle.

4 Claims, 3 Drawing Sheets

TRUCK BUMPER STEPS

BACKGROUND OF THE INVENTION

This invention relates to vehicle accessories and more particularly, to truck bumper steps that enable a person to step up into and down from a bed of a pickup truck.

Currently, most pickup trucks do not have built in or accessory devices to assist someone when stepping up into the bed of the truck or stepping down from the truck bed. As a result of the lack of such devices, to get into a truck bed a person must step up high and pull himself up a truck bumper, a difficult and strenuous task for many people. Perhaps even more problematic is getting down from the truck bed. To get down from a truck bed a person can either first sit on the tailgate and slide off or in most cases will jump from the tailgate to the ground which can result in injuries to knees, legs or other parts of the body.

Thus, a need exists for a built in or accessory device that will enable a person to easily and safely enter and exit from a bed of a truck.

The prior patented art includes the following references, but none disclose a device like the present invention.

| Pat./application No. | Inventor | Issue/Pub. Date |
| --- | --- | --- |
| 1. EP 2,252,482 | Peterson et al. | Jan. 18, 2012 |
| 2. 8,038,164 | Stahl et al. | Oct. 18, 2011 |
| 3. 8,668,217 | Zlaylek et al. | Mar. 11, 2014 |
| 4. 8,827,294 | Leitner et al. | Sep. 9, 2014 |
| 5. 9,884,601 | Candido | Feb. 6, 2018 |
| 6. 9,931,987 | Baeza | Apr. 3, 2018 |
| 7. 10,106,088 | Smith | Oct. 23, 2018 |

SUMMARY OF THE INVENTION

The primary object of the present invention is to provide a device that makes it easier to enter and exit a bed of a truck.

Another object of the present invention is to provide such a device that makes it safer to enter and particularly exit the bed of a truck in that it reduces the likelihood of injuries.

A further object of the present invention is to provide a such a device that is quick and easy to install as an accessory.

The present invention fulfills the above and other objects by providing a pair of foot steps, one that inserts into the left side and one that inserts into the right side of a Ford Truck hitch/chassis using only one bolt each to attach the foot step to the chassis frame. The bolt aligns with a hole that exist in each side of the truck frame, thus requiring no drilling to install. The step provides for easy access to the truck bed and allows a user to step down rather than jump down from the bed of their truck, thus avoiding falls or injury to knees, legs or other part of the body.

The above and other objects, features and advantages of the present invention should become even more readily apparent to those skilled in the art upon a reading of the following detailed description in conjunction with the drawings wherein there is shown and described illustrative embodiments of the invention.

DESCRIPTION OF THE DRAWINGS

In the following detailed description, reference will be made to the attached drawings in which.

DESCRIPTION OF THE PREFERRED EMBODIMENTS

Figure 1:
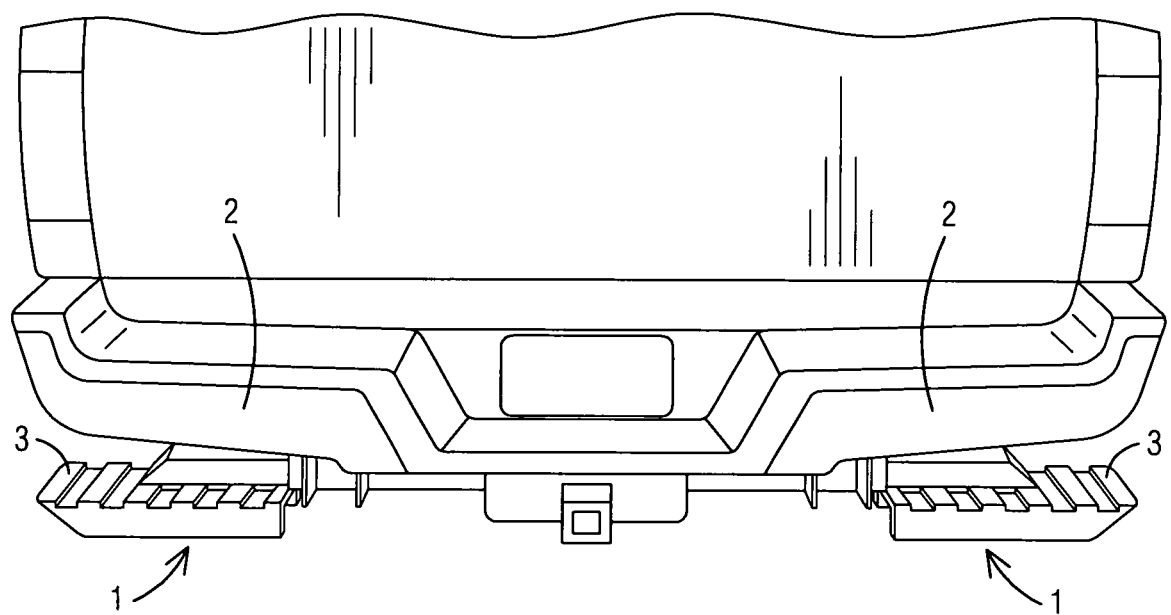
FIG. 1 is a perspective view of the truck bumper steps of the present invention installed on a pickup truck.

For purposes of describing the preferred embodiment, the terminology used in reference to the numbered components in the drawings is as follows:

1. bumper step, generally
2. truck bumper
3. foot step
4. bumper step armature
5. rear tube chassis of truck frame
6. open channel end of rear chassis rail
7. side chassis rail of truck frame
8. slot in side chassis rail (7)
9. step front
10. tube armature
11. Z-clip bracket
12. bolt
13. bolt aperture
14. Z-clip to armature weld
15. step to armature bolts (2)
16. left bumper step
17. right bumper step
18. outer end of armature Referring to the drawing figures, FIG. 1 illustrates a perspective view of the bumper steps, generally 1 of the present invention installed under both sides of a truck bumper 2. The bumper steps 1 have a planar top surface 3 that forms an area to place one's foot when stepping up onto the bumper step 1 to access a truck bed or stepdown. The step top 3 may have a ribbed plastic surface or other non-skid material, to prevent a foot from slipping.

Figure 2:
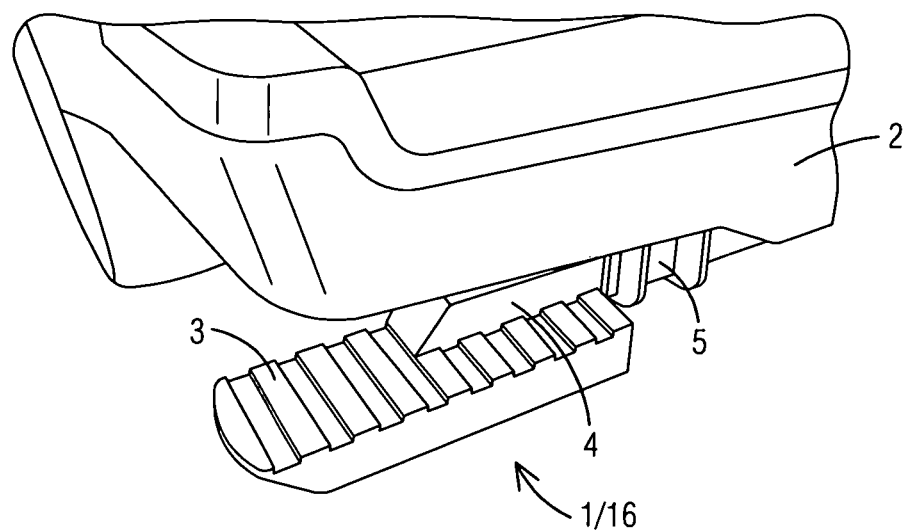
FIG. 2 is a closeup perspective view of a trunk bumper step on the present invention installed on a pickup truck.

FIG. 2 illustrates a close-up perspective view of a left/driver side bumper step 1/16 of the present invention under a vehicle bumper 2. In this view the step portion comprising the step top 3 is attached, preferably by welding to the armature 4 which in turn is inserted into a rear tube chassis rail 5 of a vehicle, in this case a truck.

Figure 3:
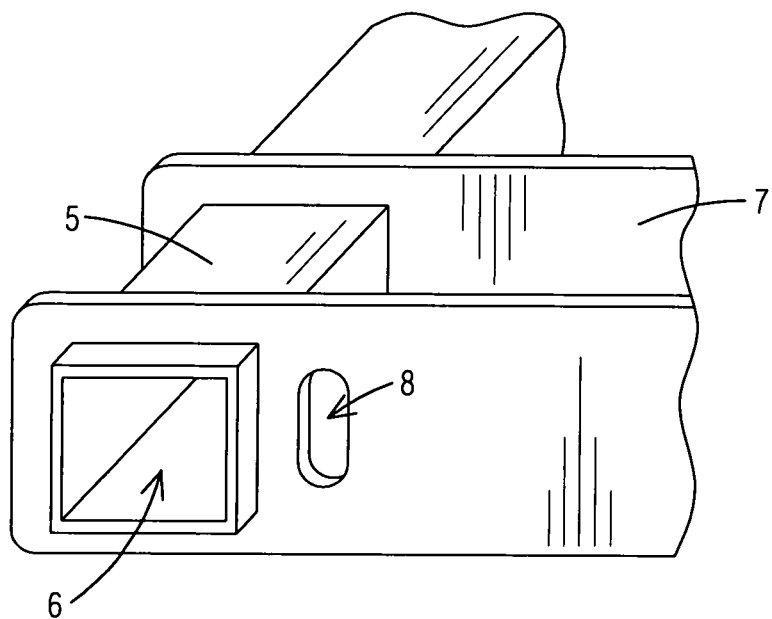
FIG. 3 is perspective partial end view of a truck chassis frame prior to installation of the truck bumper steps of the present invention.

FIG. 3 illustrates a right/passenger side end view of a chassis frame prior to installation of the bumper step of the present invention. The side chassis rail frame 7 connects to the rear tube chassis rail 5 of the truck frame to form the intersection where the bumper step (not shown) is to be located. The rear tube chassis rail 5 has an open channel end 6 into which the armature of a bumper step is inserted. The side chassis rail 7 contains a slot 8 which is uses to securely attached a bumper step using a fastener, preferably a "½ stainless steel bolt and locking nut.

Figure 4:
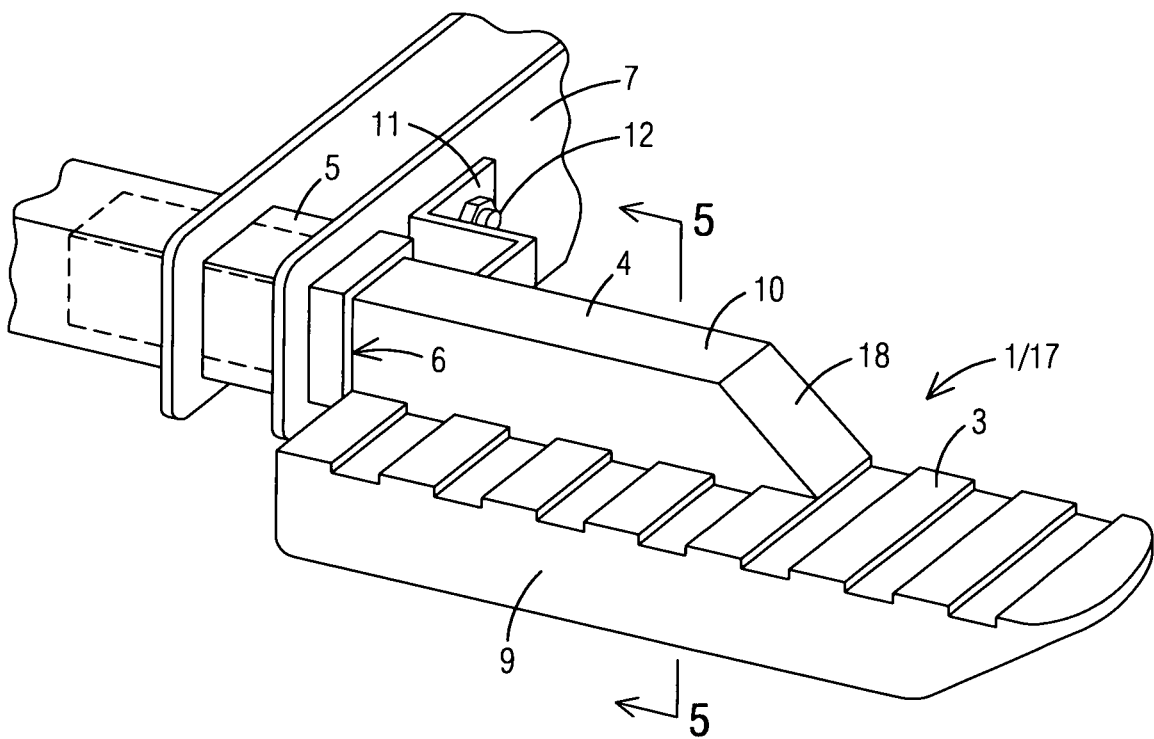
FIG. 4 is a perspective view of a truck bumper step of the present invention after installation into the truck chassis.

FIG. 4 illustrates a right/passenger side bumper step 1/17 after it has been installed on the truck frame components described in FIG. 3 above. The tube armature 10 is inserted into the channel 6 of the rear tube chassis rail 5 approximately seven inches until the Z-clip bracket 11 welded to an inner side of the armature meets the side chassis rail 7. Then a bolt 12 and nut can used in the slot (shown in FIG. 3) to secure the bumper step 1 to the side chassis rail 7 of the vehicle. Once a bumper step 1 has been installed, a user may step on the top surface 3 of the bumper step 1 when entering or exiting a vehicle at the rear, such as a truck bed. As shown, the bumper step 1 preferably has a planar front side 9 for esthetic purposes and a sealed outer end 18 on the tube armature 10.

Figure 5:
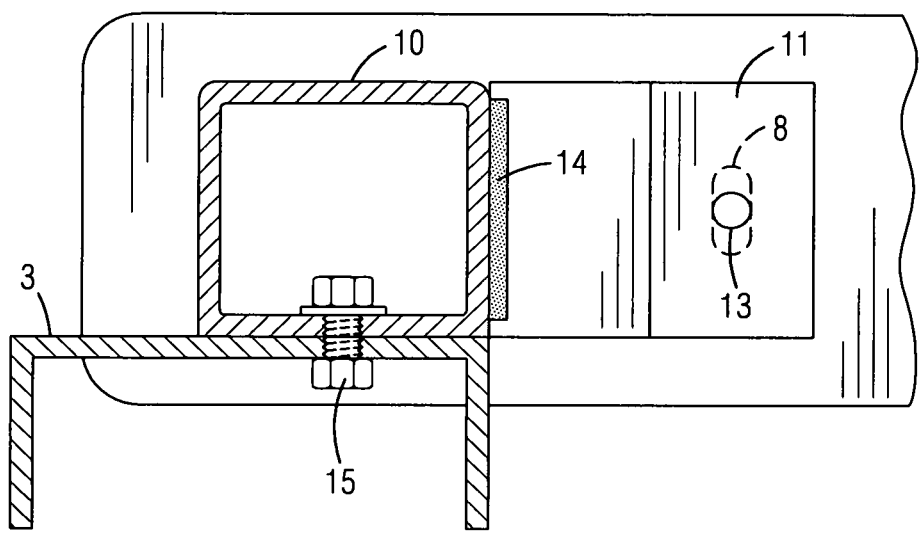
FIG. 5 is a cutaway end view of along lines 5-5 of FIG. 4 showing a truck bumper step of the present invention installed on the passenger or right side of a truck.

FIG. 5 illustrates a cutaway view of the bumper step 1/17 of the present invention showing a step 3 being a C-Channel configuration which is secured to the bottom of the tube armature 10 by two stainless steel bolts 16. The Z-clip 11 is shown as being connected by a weld 14 to an inner side of the tube armature 10 which has an aperture 13 that aligns with a slot 8 in the side chassis rail 7 (as illustrated and described above in relation to FIG. 4) into which a bolt can be inserted.

Figure 6:
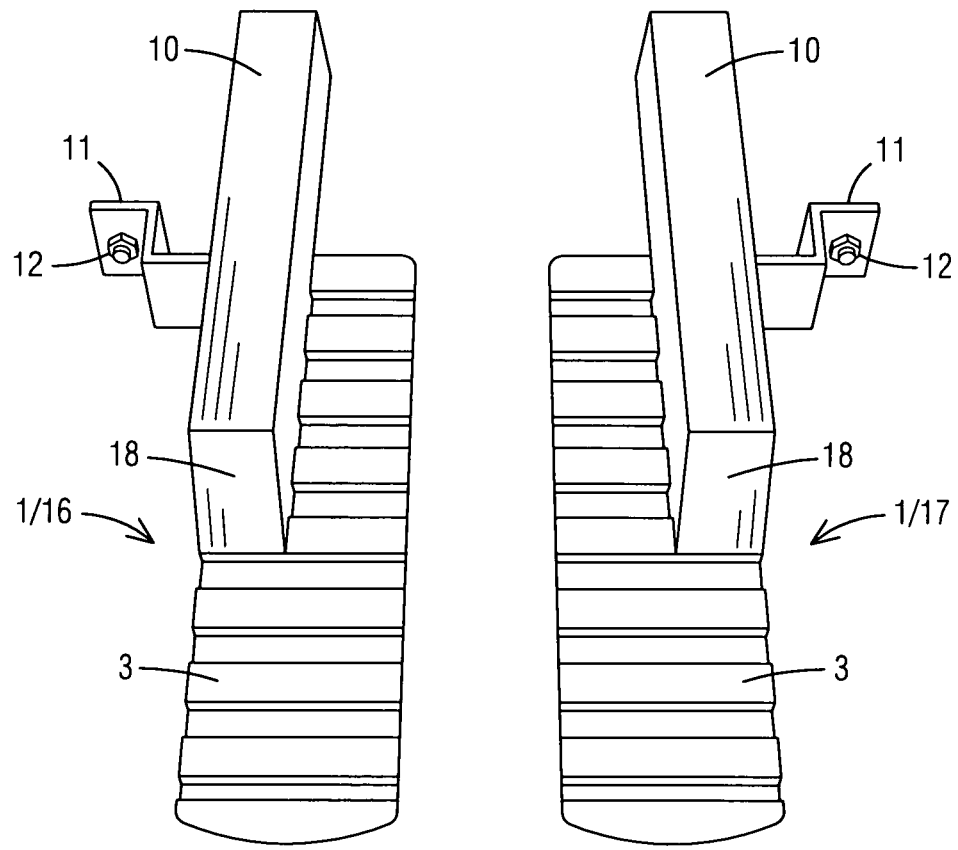
FIG. 6 is a top perspective view of a left side and right-side pair of truck bumper steps of the present invention.

FIG. 6 illustrates in side perspective views a pair of bumper steps 1, a left/driver side bumper step 1/16 and a right/passenger side bumper step 1/17. Each bumper step has a planar step portion 3 secured to a bottom side of a tube armature 10 and a Z-clip for securing the bumper step 1 by bolt to a side chassis rail 7 of a vehicle when the tube armature has been inserted into an open channel 6 on the end of a rear tube chassis rail of the frame of a truck or other vehicle. The bumper step 1 preferably has ribbed plastic or other non-slip material on the top of the step portion 3. As shown the outer end 18 of the tube armature 10 is sealed to prevent intrusion by water or other material into it.

It is to be understood that while preferred embodiments of the invention have been described, it is not to be limited to the specific form or arrangement of parts herein described and shown. It will be apparent to those skilled in the art that various changes may be made without departing from the scope of the invention and the invention is not to be considered limited to what is shown and described in the specification and/or drawings.

Having thus described my invention, I claim:

1. A bumper step for a vehicle having a rear tube chassis rail and side chassis rail, said bumper step comprising:
    a step portion having a planar top surface;
    an armature attached to and extending from the step portion for insertion into the rear tube chassis rail of the vehicle;
    a slot in the side chassis rail; and
    a connector to secure the step into the vehicle,
    wherein the connector is a Z-clip bracket attached to a forward side of the armature, said Z-clip bracket having an aperture for inserting a bolt into the slot in the side chassis rail.

2. The bumper step of claim 1 wherein the vehicle is a truck.

3. A bumper step for a truck having a rear tube chassis rail and side chassis rail, said bumper step comprising:
    a step portion having a planar top surface;
    an armature attached to and extending from the step portion for insertion into the rear tube chassis rail of the truck;
    a slot in the side chassis rail; and
    a Z-clip bracket attached to a forward side of the armature, said Z-clip bracket having an aperture for inserting a bolt into the slot in the side chassis rail.

4. A method of installing a bumper step for a truck having a rear tube chassis rail and side chassis rail with a slot, said bumper step comprising a step portion having a planar top surface; an armature attached to and extending from the step portion; and a Z-clip bracket attached to a forward side of the armature, said Z-clip bracket having an aperture, said method comprising the steps of:
    inserting the armature into an open channel on the rear tube chassis rail until the Z-clip bracket abuts the side chassis rail; and
    securing the bumper step to the vehicle by inserting a bolt through the aperture in the Z-clip bracket through the slot in the side chassis rail.

\* \* \* \* \*